April 21, 1959 D. J. CONANT 2,882,742
BALL SCREW AND NUT CONSTRUCTION
Filed Oct. 14, 1955 2 Sheets-Sheet 1

INVENTOR.
DAVID J. CONANT
BY
ATTORNEY

April 21, 1959  D. J. CONANT  2,882,742
BALL SCREW AND NUT CONSTRUCTION
Filed Oct. 14, 1955  2 Sheets-Sheet 2

INVENTOR.
DAVID J. CONANT
BY
ATTORNEY

United States Patent Office 2,882,742
Patented Apr. 21, 1959

2,882,742

BALL SCREW AND NUT CONSTRUCTION

David J. Conant, Shaker Heights, Ohio, assignor to Cleveland Pneumatic Industries, Inc., Cleveland, Ohio, a corporation of Ohio Application October 14, 1955, Serial No. 540,408

11 Claims. (Cl. 74—459)

This invention relates generally to antifriction screw devices and more particularly to a new and improved antifriction screw and nut incorporating means to reduce contact between the antifriction elements within the nut and thereby improve the overall efficiency.

It is an important object of this invention to provide a new and improved antifriction screw and nut combination incorporating means to reduce the engagement between antifriction elements within the nut and thereby improve the overall efficiency of the device.

It is another important object of this invention to provide an antifriction ball screw and nut incorporating means to insure that there are spaces between at least some of the balls within the nut so that frictional losses will be reduced and the overall efficiency of the device improved.

It is still another object of this invention to provide an anti-friction ball screw device incorporating means which reduce the amount of engagement between adjacent balls within the nut and thereby reduce the tendency for frictional losses to build up as the nut and screw rotate relative to each other.

It is still another object of this invention to provide a ball screw and nut device including a recirculating tube wherein means are provided to insure that the recirculating tube is always full of balls so that there will be spaces between at least some of the balls within the nut.

Further objects and advantages will appear from the following description and drawings, wherein.

In an antifriction ball screw and nut device incorporating a return tube, the nut and screw are each formed with helical grooves which cooperate to define a helical ball channel. Balls circulate within this helical channel and interconnect the nut and screw so that relative rotation therebetween produces relative axial motion. As the nut and screw rotate relative to each other, the balls roll along the surface of the grooves so that rotary motion between the nut and screw is converted into linear motion in a very efficient manner. However even though antifriction screw and nut devices are manufactured by precision methods to very close tolerances, small variations occur which cause some balls to tend to roll along the grooves at a faster rate than other balls. If the balls are immediately adjacent to each other or in contact when they enter the nut even the slightest tendency of some balls to roll relative to the groove with a different velocity than other balls will cause substantial engagement forces between the balls. It is inherent in antifriction screw and nut devices that adjacent balls rotate around their own axes in the same direction so there will be sliding between adjacent balls when they engage. Therefore such engagement produces frictional losses which reduces the overall efficiency of the device. This engagement, with its attendant friction, tends to build up as the nut and screw operate under load and in many cases causes an efficiency drop in excess of 20%. The maximum frictional loss between adjacent balls when only two balls engage is a function of the force of engagement of the balls with the screw and nut together with the coefficient of friction of this engagement. Consequently as the number of balls engaging each other and hereinafter define as ball chain, increases, the maximum frictional loss increases sharply. Therefore if the length of the chain of interengaging balls within the nut is kept to a minimum, a substantial overall efficiency improvement will be achieved. Tests have demonstrated that if spaces are provided between at least some of the balls within the nut, the build up of frictional loss is substantially eliminated and the overall efficiency remains at very high level as the screw and nut operate.

Figure 1:
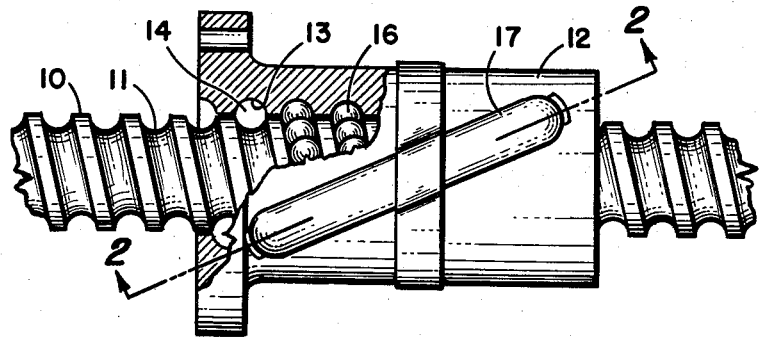
Figure 1 is a side elevation partially in longitudinal section showing a ball screw and nut incorporating this invention.

Referring to Figure 1, a screw 10 is formed with a helical groove 11 and a nut 12 is formed with a helical groove 13. The grooves 11 and 13 cooperate to define a helical passage 14 extending lengthwise of the nut and screw. Antifriction ball elements 16 are positioned in the helical passage 14 and interconnect the screw 10 and the nut 12 so that relative rotation therebetween produces relative axial motion. As the screw and nut rotate relative to each other, the balls roll along the surface of the grooves 11 and 13 and progress lengthwise of the nut and screw. Therefore it is necessary to provide a return tube 17 opening into the ends of the helical passage 14 to convey the balls 16 from one end of the nut to the other, thereby forming a continuous closed circuit of balls.

It is conventional to fill a ball screw and nut with a number of balls which will not completely fill the ball circuit. It is therefore possible to insure that there are spaces between at least some of the balls within the nut if means are provided to prevent balls from passing from the return tube into the nut before the return tube is filled with balls. This insures that the spaces between the balls are not in the return tube where they are not needed but rather are in the nut so that the average length of ball chains within the nut is reduced. To accomplish this I prefer to provide a gate means mounted adjacent to each end of the return tube 17.

Figure 2:
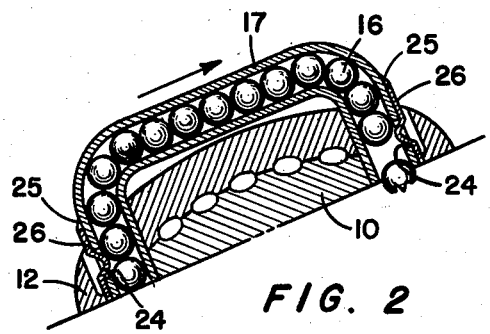
Figure 2 is a longitudinal section taken along 2—2 of Figure 1.
Figure 3:
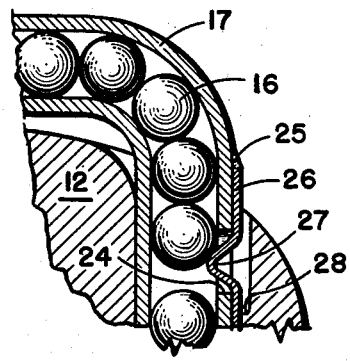
Figures 3 and 4 are enlarged fragmentary sections showing the operation of a spring latch utilized to insure that the return tube is always filled with balls.
Figure 4:
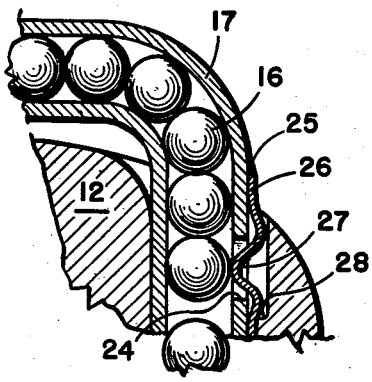

In Figures 2, 3 and 4 one of the preferred structures is shown wherein the return tube 17 is provided with an opening 24 through the outer wall thereof adjacent to each end of the return tube. A resilient spring 26 has one end 25 fastened to the return tube by any suitable means such as soldering or the like and is formed with a laterally projecting portion or gate 27 which projects into the path of the balls 16 through the opening 24. A recess 28 is formed in the nut 12 adjacent to the spring 26 to provide clearance so that the spring may be deflected radially outward relative to the tube by forces imparted on the gate 27 by the balls 16. The spring is proportioned so that the gate 27 projects into the path of the balls when it is in its unstressed condition and so that it may be deflected out of the path by the balls. Thus a detent type structure is provided which acts as a gate and resists movement of the balls past the ends of the tube.

In the operation of the device, that is when the screw 10 or nut 12 is rotated in a direction which causes the balls 16 to move through the return tube 17 in the direction indicated by the arrow in Figure 2, a substantial force is developed tending to circulate the balls through the return tube causing the springs 26 to deflect out of the path of the balls as they travel in and out of the tube. However unless the return tube 17 is completely filled with balls there will be no force transmitted to push the balls 16 past the right hand spring 26. In this instance, the right end gate 27 will retain the balls in the tube until the tube is completely filled with balls 17. If the loading and relative rotation between the screw 10 and nut 12 is such that the balls move to the left in the return tube 17, the left hand spring 26 operates as a gate to prevent movement of the balls out of the left end of the return tube into the nut unless the return tube 17 is filled with balls 16. Thus regardless of the direction of the ball movement through the return tube, there is provided means assuring that the return tube will be full of balls at all times even though the screw and nut ball circuit is not completely filled with balls. Thereafter, the gate 27 is subjected to a predetermined engagement force applied thereto by each ball and is moved out of the path of the balls. However by virtue of the inherent force of the spring 26, the gate 27 always exercises a certain force on the balls which hinder their free passage through the end of the tube and assure that the tube is completely filled before enabling the balls to move into the nut. Since the ball circuit is not completely filled with balls, the gate 27 functions as a means assuring at least one vacant space between adjacent balls within the helical passage defined by the helical grooves of the nut and screw members. Figure 3 shows the position of the spring when it is retaining the balls 16 in the return tube and Figure 4 shows the deflected position of the spring 26 when the gate is cammed out of the ball path by the balls.

Figure 5:
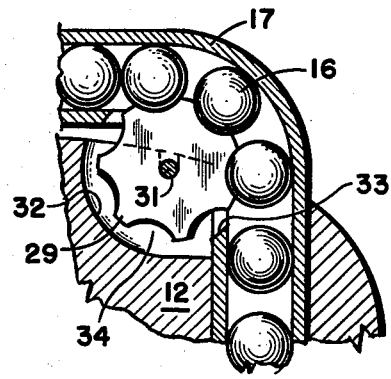
Figure 5 is a fragmentary section showing another embodiment wherein an escapement wheel is used to provide spaces between the balls within the nut.

In Figure 5 an embodiment is shown wherein an escapement wheel is pivoted for rotation in a shaft 31 mounted on the nut 12. The escapement wheel is partially positioned within a recess 32 formed in the nut 12 and is proportioned to extend through an opening 33 formed in the return tube 17 so that it may engage the balls 16. Spaced peripheral recesses 34 are formed in the escapement wheel 29 to receive individual balls 16 as they move through the return tube. Because the recesses are spaced, a spacing will be provided between adjacent balls as they pass out of the return tube into the nut. In this embodiment the balls are all initially spaced from each other as they pass into the nut so the possibility of any chains of interengaging balls within the nut is substantially eliminated.

Figure 6:
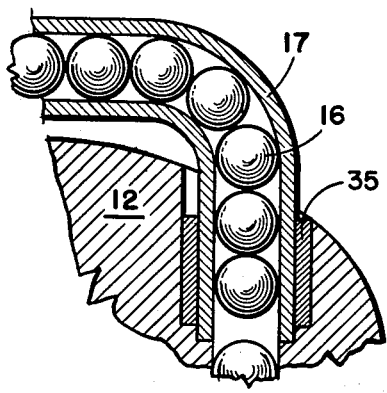
Figure 6 is a fragmentary view of another embodiment wherein a magnet is mounted around the ends of the return tube to insure that the return tube is always full of balls; and, Figures 7 through 11 are schematic views of different combinations of ball chains illustrating the possible frictional forces which can develop when chains of balls of various lengths occur within the nut.

In Figure 6 still another embodiment is shown wherein a small permanent magnet 35 is mounted on the return tube immediately adjacent the ends thereof. This magnet produces a magnetic field which resists movement of the balls out of the return tube. Of course this embodiment requires the use of balls made of a magnetic material. Like the embodiment of Figures 2 through 4 the magnet insures that the tube is completely filled with balls before they are fed to the nut, thereby assuring spaces between at least some of the balls in the nut.

In both of the embodiments shown in Figures 5 and 6 a similar structure is provided at each end of the return tube so that the device will operate regardless of the direction of the flow of balls through the return tube.

Figure 7:
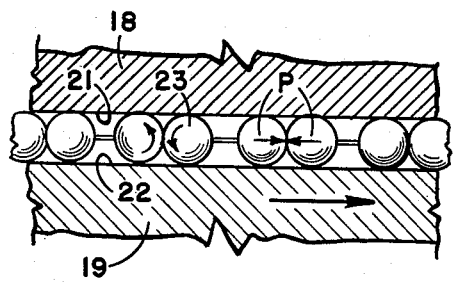

It is felt that a discussion of the potential friction losses which are caused by the build up of chains of balls within the nut will assist in an understanding of the importance of this invention. Figures 7 through 11 provide a graphical illustration of how frictional forces may be developed as the result of interengaging balls. In each of these figures the upper member 18 represents to the nut 12 and the lower member 19 represents to the screw 10. These two members 18 and 19 provide opposed surfaces 21 and 22 which correspond to the surfaces of the grooves 13 and 11 respectively. Positioned between the surfaces 21 and 22 are antifriction balls 23. Assuming the left hand ball in each chain tends to roll faster than the corresponding right hand ball, there will be a tendency for the left hand balls to catch up and press against the right hand balls. This produces an engagement force "P" the magnitude of which is determined by the amount of force between each of the balls and the surfaces 21 and 22 times the coefficient of friction therebetween. Therefore, the frictional loss due to the engagement between the balls in chains wherein there are only two balls in each chain as shown in Figure 7 is the product of the force "P" times the coefficient of friction between the balls.

Figure 8:
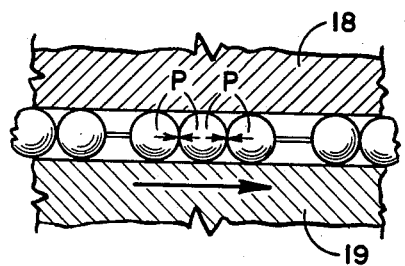

Reference should now be made to Figure 8 wherein a chain of three balls is shown. In this case the left hand ball of the chain can produce a force "P" along its engagement with the center ball, and the right hand ball can also produce an engaging force "P" along its engagement with the center ball. Therefore the potential frictional loss is 2P times the coefficient of friction of the engagement. Thus the addition of one ball to the chain can double the frictional loss.

Figure 9:
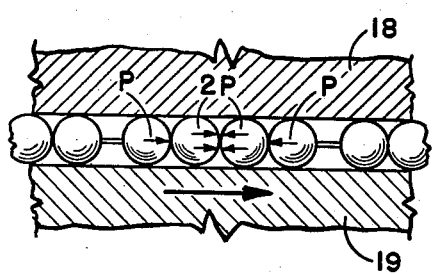
Figure 10:
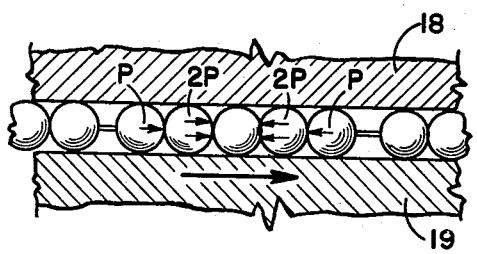
Figure 11:
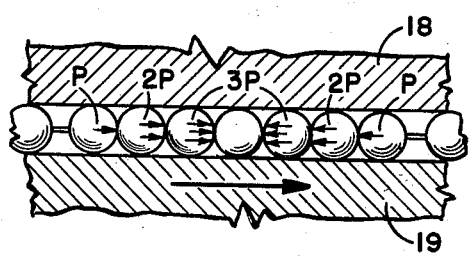

If there are four balls in the chain as shown in Figure 9 the left hand ball can produce a force "P" along the engagement with its adjacent ball and the right hand ball can produce a force "P" in the opposite direction along its engagement with its adjacent ball. However the force "P" of the left and right balls is added to the force which can be developed by the engagement of the center balls with the surfaces 21 and 22 so that the center two balls can engage with a force 2P. Therefore the maximum frictional loss due to the engagement of the balls is equal to the product of the coefficient of friction of the engagement times 4P. Thus the potential frictional loss when a chain of four balls is present is twice the potential frictional loss when a chain of three balls is present and four times as great as the potential frictional loss when two balls are present. In Figure 10 a chain of five balls is shown and in this case the potential frictional loss by the engagement between the balls is equal to the coefficient of friction of engagement times 6P. In Figure 11 a chain of 7 balls is shown and in this case the potential frictional loss due to the immediate engagement between the balls is equal to the coefficient of friction of the engagement times 12P.

Those skilled in the art will therefore recognize that functional losses build up very rapidly as the chains of engaging balls within the nut increase in length and also that if the chains are long enough forces may be developed which prevent rolling of the balls and results in destructive wear and even complete failure of the device. It is therefore highly desirable to provide means to insure that there will be spaces between at least some of the balls within the nut so that the chains of balls which develop will have a minimum length or be eliminated completely.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An antifriction screw comprising nut and screw members each formed with a helical groove which mutually cooperate to form a helical passage extending lengthwise of said members, recirculating means connecting the ends of said passage cooperating therewith to form a closed circuit, antifriction elements in said circuit engaging the walls of said groove and interconnecting said members whereby relative rotation between said members produces relative axial motion therebetween, the number of antifriction elements being insufficient to fill said circuit, and means maintaining a spaced relationship between at least some adjacent elements in said helical passage.

2. An antifriction screw device comprising a pair of cooperating screw threaded members interconnected by antifriction elements wherein relative rotational movement between said members produces relative axial movement therebetween and causes said elements to roll along the threads of said members, recirculating means for conveying said elements axially relative to one of said members, and means maintaining a spaced relationship at least between some of the adjacent elements rolling along said threads.

3. An antifriction screw comprising nut and screw members each formed with a helical groove which mutually cooperate to form a helical passage extending lengthwise of said members, recirculating means connecting the ends of said passage cooperating therewith to form a closed circuit, antifriction elements in said circuit engaging the walls of said groove and interconnecting said members whereby relative rotation between said members produces relative motion therebetween and causes said elements to move around said circuit, the number of antifriction elements being insufficient to fill said circuit, and means maintaining a spaced relationship between at least some adjacent elements as they leave said recirculating means and enter said grooves.

4. An antifriction screw device comprising a pair of cooperating screw threaded members interconnected by antifriction elements wherein relative rotational movement between said members produces relative axial movement therebetween and causes said elements to engage and roll along the threads of said members, recirculating means for conveying said elements axially relative to one of said members, and means maintaining a spaced relationship between at least some of the adjacent elements as they move from said recirculating means into engagement with said threads.

5. An antifriction screw comprising nut and screw members each formed with a helical groove which mutually cooperates to form a helical passage extending lengthwise of said members, recirculating means connecting the ends of said passage cooperating therewith to form a closed circuit, antifriction elements in said circuit engaging the walls of said groove and interconnecting said members whereby relative rotation between said members produces relative axial motion therebetween, the number of antifriction elements being insufficient to fill said circuit, and means maintaining said recirculating means full of said antifriction elements whereby at least some of said antifriction elements within said helical passage are maintained in a spaced relationship.

6. An antifriction screw comprising nut and screw members each formed with a helical groove which mutually cooperate to form a helical passage extending lengthwise of said members, recirculating means connecting the ends of said passage cooperating therewith to form a closed circuit, antifriction elements in said circuit engaging the walls of said groove and interconnecting said members whereby relative rotation between said members produces relative motion therebetween and causes said elements to roll along said grooves, the number of antifriction elements being insufficient to fill said circuit, and means adjacent to the ends of said helical passage hindering movement of said elements from said recirculating means into said helical passage.

7. An antifriction screw comprising nut and screw members each formed with a helical groove which mutually cooperate to form a helical passage extending lengthwise of said members, a return tube connecting the ends of said passage cooperating therewith to form a closed circuit, antifriction elements in said circuit engaging the walls of said groove and interconnecting said members whereby relative rotation between said members produces relative motion therebetween and causes said elements to circulate around said circuit, the number of antifriction elements being insufficient to fill said circuit, and a resilient means mounted adjacent to one end of said tube normally projecting into the path of said elements as they circulate around said circuit and movable out of said path by virtue of a predetermined engagement force applied thereto by said elements.

8. An antifriction screw comprising nut and screw members each formed with a helical groove which mutually cooperate to form a helical passage extending lengthwise of said members, a return tube connecting the ends of said passage cooperating therewith to form a closed circuit, magnetic antifriction elements in said circuit engaging the walls of said groove and interconnecting said members whereby relative rotation between said members produces relative motion therebetween and causes said elements to roll along said grooves, the number of antifriction elements being insufficient to fill said circuit, and a magnet adjacent to each end of said passage producing a magnetic field in said circuit which hinders movement of said element out of said return tube into said passage.

9. An antifriction screw comprising nut and screw members each formed with a helical groove which mutually cooperate to form a helical passage extending lengthwise of said members, a return tube connecting the ends of said passage and cooperating therewith to form a closed circuit, antifriction elements in said circuit engaging the walls of said groove and interconnecting said members whereby relative rotation between said members produces relative motion therebetween and causes said elements to roll along said grooves, the number of antifriction elements being insufficient to fill said circuit, and escapement means engaging and permitting said elements to pass from said return tube into said passage with a vacant space between adjacent elements as they move into said passage.

10. An antifriction screw comprising nut and screw members each formed with a helical groove which mutually cooperate to form a helical passage extending lengthwise of said members, a return tube connecting the ends of said passage cooperating therewith to form a closed circuit, antifriction elements in said circuit engaging the walls of said groove and interconnecting said members whereby relative rotation between said members produces relative motion therebetween and causes said elements to roll along said grooves, the number of antifriction elements being insufficient to fill said circuit, and a rotatable escapement wheel mounted adjacent to an end of said tube projecting into said circuit, said wheel being formed with spaced recesses each adapted to receive one of said elements and thereby space adjacent elements as they pass into said passage.

11. An antifriction screw comprising nut and screw members each formed with a helical groove which mutually cooperate to form a helical passage extending lengthwise of said members, a return tube connecting the ends of said passage cooperating therewith to form a closed circuit, antifriction elements formed of magnetic material in said circuit engaging the walls of said groove and interconnecting said members whereby relative rotation between said members produces relative motion therebetween and causes said elements to roll along said grooves, the number of antifriction elements being insufficient to fill said circuit, and a magnet hindering movement of said elements from said return tube into said passage.

References Cited in the file of this patent
UNITED STATES PATENTS

| | | |
|---|---|---|
| 1,704,031 | Boem | Mar. 5, 1929 |
| 2,444,886 | Vickers | July 6, 1948 |